United States Patent
Nose et al.

(10) Patent No.: US 12,472,972 B2
(45) Date of Patent: Nov. 18, 2025

(54) VEHICLE CONTROL DEVICE, VEHICLE CONTROL METHOD, NON-TRANSITORY STORAGE MEDIUM

(71) Applicant: TOYOTA JIDOSHA KABUSHIKI KAISHA, Toyota (JP)

(72) Inventors: Masashi Nose, Nagoya (JP); Tomoaki Miyazawa, Nagoya (JP); Kazuya Kumazawa, Nagoya (JP); Miki Tsujino, Nagakute (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 18/517,943

(22) Filed: Nov. 22, 2023

(65) Prior Publication Data

US 2024/0174253 A1    May 30, 2024

(30) Foreign Application Priority Data

Nov. 25, 2022    (JP) .................................. 2022-188774

(51) Int. Cl.
*B60W 50/14* (2020.01)
*B60W 30/18* (2012.01)

(52) U.S. Cl.
CPC ...... *B60W 50/14* (2013.01); *B60W 30/18163* (2013.01); *B60W 2050/146* (2013.01)

(58) Field of Classification Search
CPC ........... B60W 50/14; B60W 30/18163; B60W 2050/146
See application file for complete search history.

(56) References Cited

U.S. PATENT DOCUMENTS

| | | | | |
|---|---|---|---|---|
| 10,807,608 | B2* | 10/2020 | Nishiguchi | ........... B60W 30/12 |
| 2012/0173069 | A1* | 7/2012 | Tsimhoni | ........... G01C 21/3664 |
| | | | | 701/25 |
| 2018/0346026 | A1* | 12/2018 | Fujii | ..................... B62D 15/025 |
| 2018/0348759 | A1* | 12/2018 | Freeman | .............. A61N 1/3904 |
| 2019/0286160 | A1* | 9/2019 | Toda | ..................... G05D 1/0214 |
| 2020/0079379 | A1* | 3/2020 | Mimura | ................ B60W 10/04 |
| 2020/0086890 | A1 | 3/2020 | Ikeda et al. | |
| 2021/0107510 | A1* | 4/2021 | Kato | ............... B60W 30/18163 |
| 2022/0055481 | A1* | 2/2022 | Shimizu | ............... B60K 35/233 |

FOREIGN PATENT DOCUMENTS

| | | |
|---|---|---|
| JP | 2020-44988 A | 3/2020 |
| JP | 2021-62696 A | 4/2021 |
| JP | 2022-118036 A | 8/2022 |

* cited by examiner

Primary Examiner — Mohamed Barakat
(74) Attorney, Agent, or Firm — Oblon, McClelland, Maier & Neustadt, L.L.P.

(57) ABSTRACT

A vehicle control device including a processor that, after a first lane change control has been executed on a vehicle traveling in a cruising lane to move the vehicle to a target lane, is configured to execute a second lane change control on the vehicle to return the vehicle from the target lane to the cruising lane, and a display device that is configured to display a first image expressing information related to a start of the second lane change control prior to the second lane change control being executed on the vehicle traveling in the target lane.

7 Claims, 7 Drawing Sheets

VEHICLE CONTROL DEVICE, VEHICLE CONTROL METHOD, NON-TRANSITORY STORAGE MEDIUM

CROSS-REFERENCE TO RELATED APPLICATION

This application is based on and claims priority under 35 USC 119 from Japanese Patent Application No. 2022-188774 filed on Nov. 25, 2022, the disclosure of which is incorporated by reference herein.

BACKGROUND

Technical Field

The present disclosure relates to a vehicle control device, a vehicle control method, and a non-transitory storage medium.

Related Art

A vehicle capable of executing overtake assist control is disclosed in Japanese Patent Application Laid-Open (JP-A) No. 2020-44988. Namely, this vehicle is able to execute a first lane change control to move a vehicle traveling in a cruising lane into a target lane that is a lane different to the cruising lane, and execute a second lane change control to return the vehicle from the target lane to the cruising lane.

Sometimes there are situations in which, when the vehicle has been moved to the target lane under the first lane change control, a condition to start the second lane change control is not satisfied for a specific period of time. Such cases give rise to a concern that an occupant of the vehicle might feel anxious. The technology of JP-A No. 2020-44988 accordingly has room for improvement in this regard.

In consideration of the above circumstances, an object of the present disclosure is to obtain a vehicle control device, a vehicle control method, and a non-transitory storage medium that readily impart a sense of security to an occupant of a vehicle prior to start of a second lane change control to return the vehicle from a target lane to a cruising lane, after the vehicle has been moved to the target lane from the cruising lane under a first lane change control.

SUMMARY

A vehicle control device of a first aspect of the present disclosure includes a processor that, after a first lane change control has been executed on a vehicle traveling in a cruising lane to move the vehicle to a target lane, is configured to execute a second lane change control on the vehicle to return the vehicle from the target lane to the cruising lane, and a display device that is configured to display a first image expressing information related to a start of the second lane change control prior to the second lane change control being executed on the vehicle traveling in the target lane.

The processor of the vehicle control device of the first aspect executes the second lane change control to return the vehicle from the target lane to the cruising lane after the first lane change control was executed on the vehicle to move the vehicle traveling in the cruising lane to the target lane. Furthermore, the display device is able to display the first image expressing information related to the start of the second lane change control prior to the second lane change control being executed on the vehicle traveling in the target lane. The vehicle control device of the first aspect accordingly readily imparts a sense of security to an occupant looking at the display device prior to the second lane change control being executed.

A vehicle control device of a second aspect of the present disclosure is the first aspect, wherein the display device displays the first image when the second lane change control has not been in an executable state for a period of time equivalent to a first threshold from a first time when the vehicle was moved from the cruising lane to the target lane under the first lane change control.

The display device of the vehicle control device of the second aspect displays the first image when the second lane change control has not been in the executable state for the period of time equivalent to a first threshold from a first time at which the vehicle was moved from the cruising lane to the target lane under the first lane change control. In other words, the display device does not display the first image before a period of time less than the first threshold has elapsed from the first time. The vehicle control device of the second aspect is not liable to make the occupant feel vexed.

A vehicle control device of a third aspect of the present disclosure is the first aspect, wherein a predicted time until the second lane change control will be in an executable state is included in the first image.

The first image displayed by the display device of the vehicle control device of the third aspect includes the predicted time until the second lane change control is likely to be in the executable state in the first image displayed. The occupant looking at the first image in the vehicle control device of the third aspect is accordingly able to be aware of the time until the second lane change control is likely to be in an executable state.

A vehicle control device of a fourth aspect of the present disclosure is the first aspect, wherein the display device displays a second image expressing information related to interruption of the second lane change control when a first interrupt condition of the second lane change control has been satisfied while the vehicle is traveling in the target lane.

The display device of the vehicle control device of the fourth aspect displays the second image expressing information related to interruption of the second lane change control when the first interrupt condition of the second lane change control has been satisfied while the vehicle is traveling in the target lane. An occupant looking at the second image in the vehicle control device of the fourth aspect is accordingly able to be aware that the second lane change control has been interrupted.

The vehicle control device of the fifth aspect of the present disclosure is the first aspect, wherein the display device does not display the first image when a second interrupt condition of the second lane change control has been satisfied as a result of an occupant of the vehicle performing a specific action while the vehicle is traveling in the target lane.

The display device of the vehicle control device of the fifth aspect does not display the first image when the second interrupt condition of the second lane change control has been satisfied while the vehicle is traveling in the target lane. The second interrupt condition is satisfied when the occupant has performed the specific action. Namely, the occupant is able to be aware that the second lane change control is interrupted without looking at the display device. The vehicle control device of the fifth aspect is not liable to make the occupant feel vexed.

A vehicle control method of the present disclosure includes, by a processor, after a first lane change control has been executed on a vehicle traveling in a cruising lane to move the vehicle to a target lane, executing a second lane change control on the vehicle to return the vehicle from the target lane to the cruising lane, and displaying a first image expressing information related to a start of the second lane change control prior to the second lane change control being executed on the vehicle traveling in the target lane.

A non-transitory storage medium of the present disclosure is a non-transitory storage medium stored with a program executable by a computer to perform processing. The processing includes, after a first lane change control has been executed on a vehicle traveling in a cruising lane to move the vehicle to a target lane, executing a second lane change control on the vehicle to return the vehicle from the target lane to the cruising lane, and displaying a first image expressing information related to a start of the second lane change control prior to the second lane change control being executed on the vehicle traveling in the target lane.

As described above, the vehicle control device, the vehicle control method, and the non-transitory storage medium according to the present disclosure exhibit the excellent advantageous effect of, for an occupant of a vehicle that was moved to a target lane from a cruising lane under a first lane change control, readily imparting a sense of security to the occupant prior to start of a second lane change control to return the vehicle from the target lane to the cruising lane.

BRIEF DESCRIPTION OF THE DRAWINGS

Exemplary embodiments of the present disclosure will be described in detail based on the following figures, wherein.

DETAILED DESCRIPTION

Figure 1:
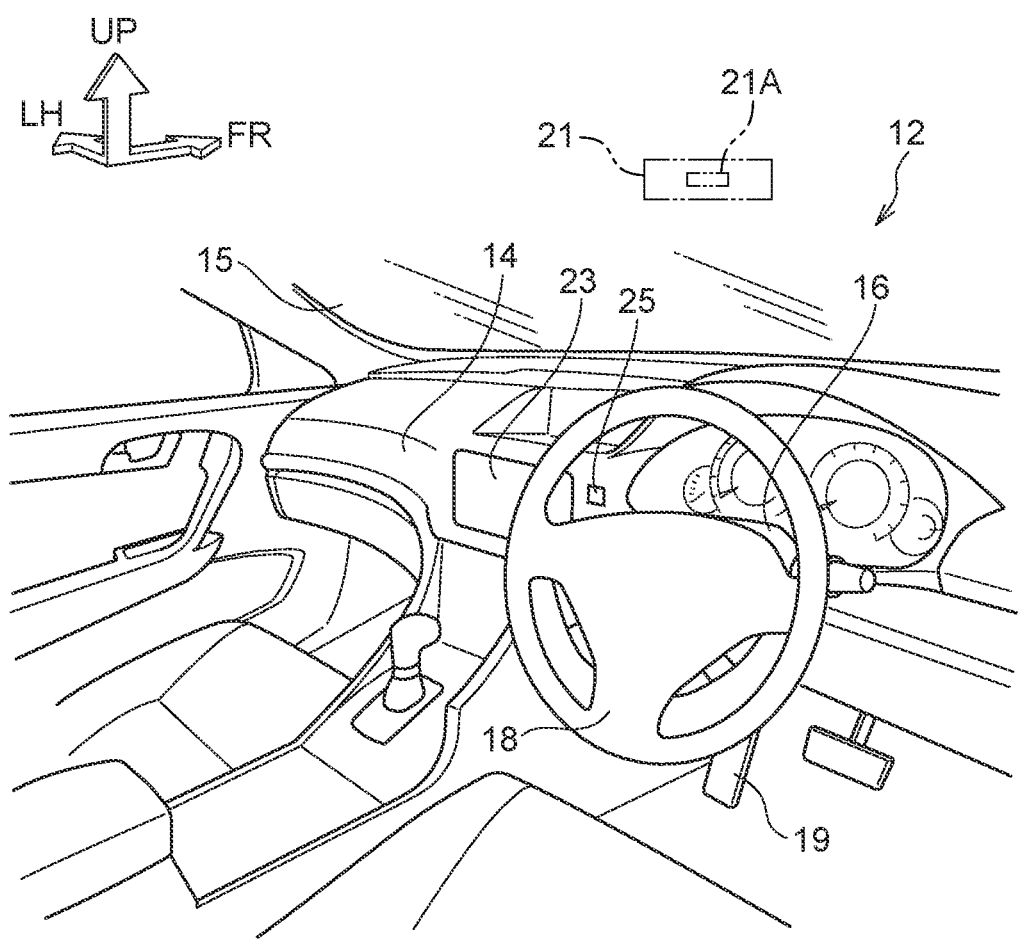
FIG. 1 is a diagram illustrating an interior of a vehicle equipped with a vehicle control device according to an exemplary embodiment.

Description follows regarding exemplary embodiments of a vehicle control device, a vehicle control method, and a non-transitory storage medium according to the present disclosure, with reference to the drawings. As appropriate in the drawings, an arrow FR indicates a vehicle front-rear direction front side, an arrow LH indicates a vehicle left-right direction left side, and an arrow UP indicates a vehicle height direction upper side.

A vehicle 12 installed with a vehicle control device 10 includes an instrument panel 14 and a front windshield 15 such as illustrated in FIG. 1. A steering column 16 is provided to the instrument panel 14, and a steering wheel 18 is supported by the steering column 16 so as to be able to rotate.

As illustrated in FIG. 1, a sensor unit 21 is provided to an upper portion of a vehicle inside face of the front windshield 15. The sensor unit 21 includes a camera 21A that captures an imaging subject at a position in front of the front windshield 15 through the front windshield 15, a millimeter wave radar that transmits probe waves and receives reflected waves (omitted in the drawings), and a laser imaging detection and ranging (LIDAR) that scans in front of the vehicle 12 (omitted in the drawings). The vehicle 12 also includes plural cameras (omitted in the drawings) separate to the camera 21A. These cameras are collectively called a surrounding monitoring camera group.

Figure 2:
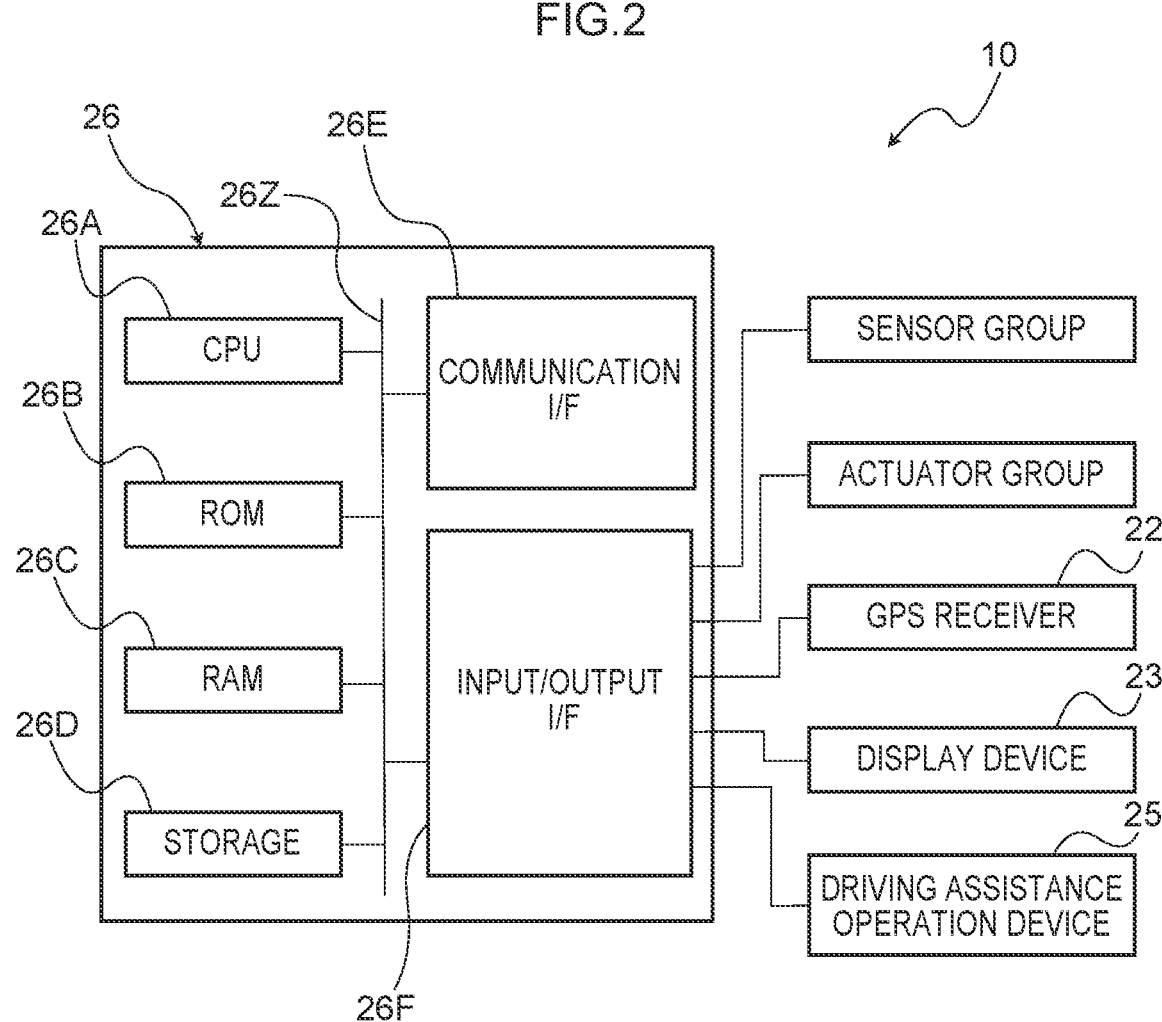
FIG. 2 is a diagram illustrating a hardware configuration of the vehicle illustrated in FIG. 1.

As illustrated in FIG. 2, the vehicle 12 includes a global positioning system (GPS) receiver 22. The GPS receiver 22 acquires information related to a position where the vehicle 12 is traveling by receiving GPS signals transmitted by GPS satellites (hereafter referred to as "location information").

As illustrated in FIG. 1 and FIG. 2, a display device 23 is provided to the instrument panel 14.

As illustrated in FIG. 1 and FIG. 2, a driving assistance operation device 25 is provided to the instrument panel 14. The driving assistance operation device 25 is a device to execute driving assistance control on the vehicle 12, as described later. The vehicle 12 is able to execute driving assistance control when the driving assistance operation device 25 is in an ON state. The vehicle 12 is not able to execute driving assistance control when the driving assistance operation device 25 is in an OFF state.

As illustrated in FIG. 2, the vehicle 12 includes an electronic control unit (ECU) 26 serving as hardware configuration.

The ECU 26 is configured including a central processing unit (CPU) (processor) (computer) 26A, read only memory (ROM) (non-transitory storage medium) (recording medium) 26B, random access memory (RAM) 26C, storage (non-transitory storage medium) (recording medium) 26D, a communication I/F 26E, and an input/output I/F 26F. The CPU 26A, the ROM 26B, the RAM 26C, the storage 26D, the communication I/F 26E, and the input/output I/F 26F are connected together through an internal bus 26Z so as to be capable of communicating with each other.

The CPU 26A is a central processing unit that executes various programs and controls each section. The CPU 26A reads a program from the ROM 26B or the storage 26D, and executes the program using the RAM 26C as workspace. The CPU 26A performs control of each configuration and various computation processing according to programs stored on the ROM 26B or the storage 26D.

The ROM 26B stores various programs and various data. The RAM 26C serves a workspace to temporarily store a program or data. The storage 26D is configured by a storage device such as a hard disk drive (HDD), solid state drive (SSD), or the like, and stores various programs and various data. First image data representing a first image 40 and second image data representing a second image 41 are also stored on the ROM 26B or the storage 26D. The first image 40 and the second image 41 are described later.

The communication I/F 26E is an interface for connecting the ECU 26 to other ECUs (omitted in the drawings) through an external bus (omitted in the drawings). This interface employs, for example, a communication standard under a CAN protocol.

The input/output I/F 26F is an interface for communication with various devices. These devices include, for example, the camera 21A, the millimeter wave radar, the LIDAR, the surrounding monitoring camera group, the GPS receiver 22, the display device 23, the driving assistance operation device 25, and an actuator group (described later).

Figure 3:
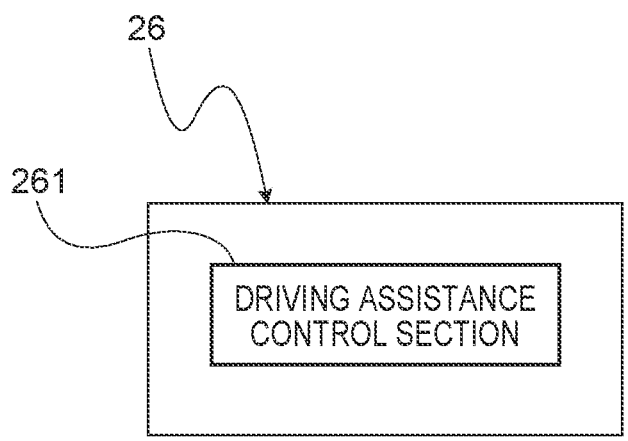
FIG. 3 is a functional block diagram of the ECU illustrated in FIG. 2.

FIG. 3 illustrates a block diagram as an example of a functional configuration of the ECU 26. The ECU 26 incudes, as functional configuration, a driving assistance control section 261. The driving assistance control section 261 is implemented by the CPU 26A reading and executing the program stored on the ROM 26B.

When the driving assistance operation device 25 is in an ON state, the driving assistance control section 261 utilizes the sensor group and the actuator group (omitted in the drawings) provided to the vehicle 12, and executes driving assistance control in the vehicle 12 of level 1 to level 5 automation in the driving automation scale (the automated driving scale) as defined by the Society of Automotive Engineers (SAE). Moreover, when the driving assistance operation device 25 is in the ON state, a level of driving automation and driving assistance control execution are selectable by an action of an occupant of the vehicle 12 on the driving assistance operation device 25. The driving assistance control of the present exemplary embodiment includes, for example, adaptive cruise control (ACC), lane tracing assist/lane keeping assist control (LTA), lane change assist/lane change assist control (LCA), and overtake assist control. The sensor group provided to the vehicle 12 includes the sensor unit 21 and the surrounding monitoring camera group. The actuator group provided to the vehicle 12 includes various electrical actuators for driving the brake system, electric power steering including the steering wheel 18, and an internal combustion engine serving as a driving source, and includes an electric motor serving as a driving source.

Description follows regarding overtake assist control. First lane change control and second lane change control are included in the overtake assist control. The first lane change control and the second lane change control are controls similar to LCA.

Figure 4:
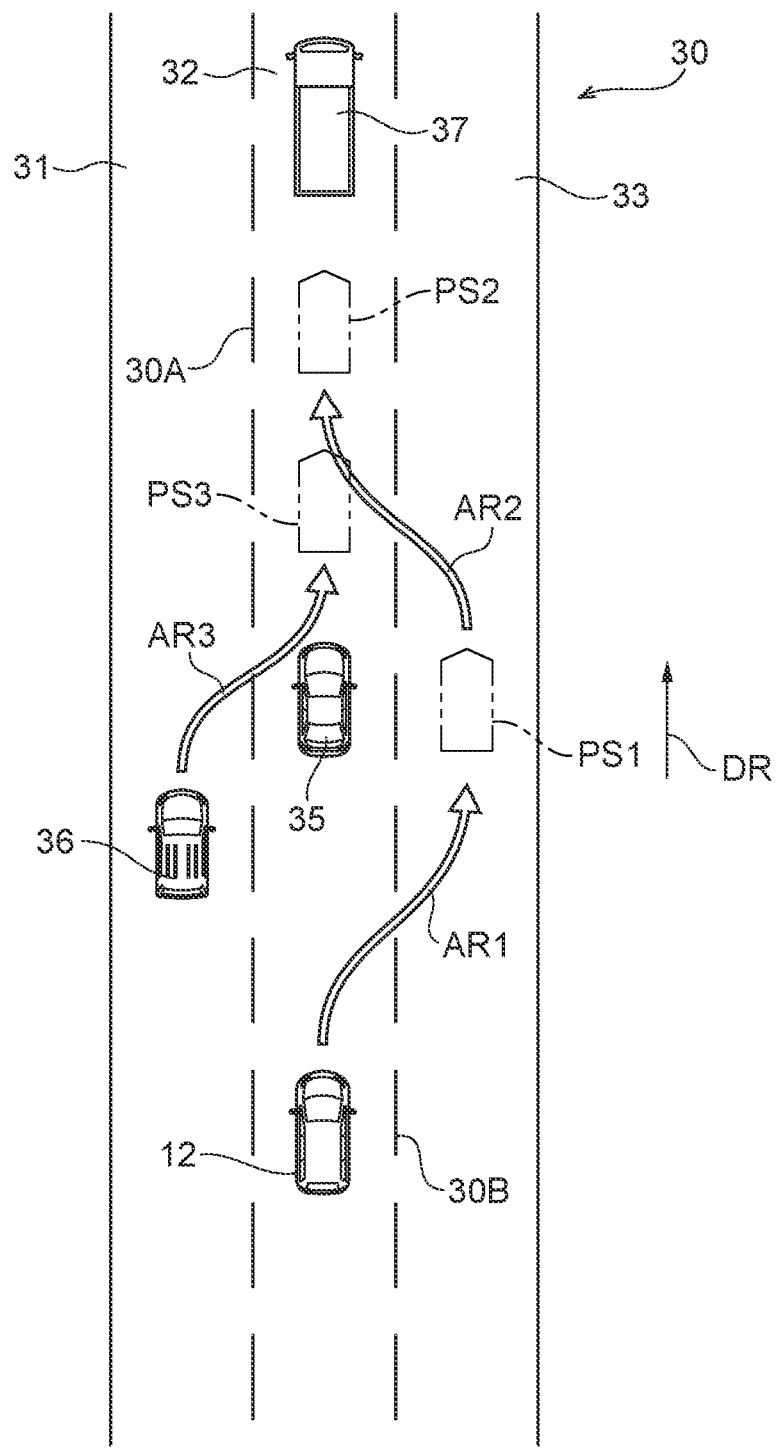
FIG. 4 is a plan view of the vehicle illustrated in FIG. 1, together with surrounding vehicles and highway.

When a specific first condition has been satisfied, the driving assistance control section 261 displays text expressing a first confirmation request on the display device 23. For example, the display device 23 displays text of "Execute overtake assist control?" as text expressing the first confirmation request. Suppose that the vehicle 12 is traveling on a highway 30 as illustrated in FIG. 4. The highway 30 is a traffic way in a country with a regulation stipulating that vehicles should keep to the left side. The highway 30 includes a first lane 31, a second lane 32, and a third lane 33. The first lane 31 and the second lane 32 are demarcated by a demarcation line 30A, and the second lane 32 and the third lane 33 are demarcated by a demarcation line 30B. An arrow DR illustrated in FIG. 4 indicates a progression direction of the vehicle 12. For example, the first condition is satisfied, when the vehicle 12 traveling in the second lane 32 (cruising lane) executes ACC, and a difference between a set speed of the vehicle 12 as set by the ACC and a speed of an other-vehicle 35 traveling immediately in front of the vehicle 12 becomes a specific value or lower.

The driving assistance control section 261 starts the first lane change control when an occupant performs a first acknowledgement action after the text expressing the first confirmation request has been displayed on the display device 23. For example, a specific action performed on the driving assistance operation device 25 by the occupant gripping the steering wheel 18 with their hands and visually checking a lane change direction is a first acknowledgement action. When the first lane change control has been started, the driving assistance control section 261 monitors the surroundings of the vehicle 12 based on information acquired from the sensor group. Furthermore, the driving assistance control section 261 moves the vehicle 12 to the right side after determination that the vehicle 12 is able to execute a lane change to the right side safely. For example, when determination is made that the vehicle 12 is able to change lanes to the third lane 33 along a travel path AR1 of FIG. 4, the driving assistance control section 261 controls the above actuator group such that the vehicle 12 is moved from the second lane 32 to the third lane 33 (target lane) that is the lane adjacent to the second lane 32 on the right. For example, the driving assistance control section 261 ends the first lane change control when the vehicle 12 has been moved as far as a position PS1 on the third lane 33 along the travel path AR1.

At a first time that is the time when the first lane change control finished, the driving assistance control section 261 starts determination as to whether or not the vehicle 12 would be able to safely execute a lane change to the left side based on information acquired from the sensor group. In other words, the driving assistance control section 261 starts determination as to whether or not the second lane change control is executable. The driving assistance control section 261 displays text expressing a second confirmation request on the display device 23 when determined that the second lane change control is executable. For example, the driving assistance control section 261 displays text expressing a second confirmation request on the display device 23 when determined that the vehicle 12 that had moved to the position PS1 of FIG. 4 is able to perform a lane change to the second lane 32 along a travel path AR2 of FIG. 4. For example, the display device 23 displays text of "Return to original lane?" as text expressing the second confirmation request.

Figure 5:
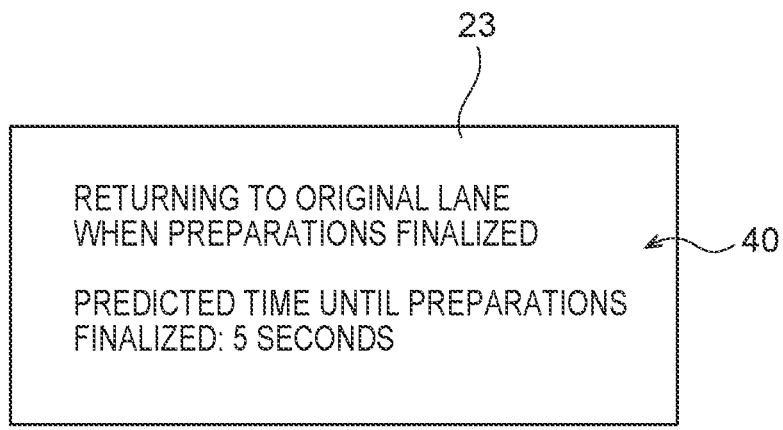
FIG. 5 is a diagram illustrating a display device displaying a first image.

Furthermore, in cases in which text expressing the second confirmation request is not displayed on the display device 23 when a period of time equivalent to a first threshold has elapsed from the first time, the driving assistance control section 261 reads first image data from the ROM 26B or the storage 26D, and displays a first image 40 based on the first image data on the display device 23 as illustrated in FIG. 5. The first image 40 includes information related to starting the second lane change control. For example, the first image 40 includes text of "Returning to original lane when preparations finalized". The first threshold is, for example 10 seconds.

Furthermore, when the first image 40 is displayed on the display device 23, the driving assistance control section 261 displays on the display device 23 a predicted time from the current time until a time the second lane change control would be able to start based on a surrounding monitoring situation. For example, text of "Predicted time until preparations finalized: 5 seconds" as illustrated in FIG. 5 is displayed on the display device 23 for a case in which the predicted time is currently 5 seconds. Display related to this predicted time is configured by part of the first image 40.

The driving assistance control section 261 starts the second lane change control when the occupant performs a second acknowledgement action after text expressing the second confirmation request has been displayed on the display device 23. For example, a specific action on the driving assistance operation device 25 is the second acknowledgement action. When the second lane change control has been started, the driving assistance control section 261 moves the vehicle 12 to the left while monitoring surroundings of the vehicle 12 based on information acquired from the sensor group. For example, the driving assistance control section 261 controls the above actuator group so as to move the vehicle 12 from the third lane 33 to the second lane 32. The driving assistance control section 261 ends the second lane change control when, for example, the vehicle 12 has moved along the travel path AR2 as far as a position PS2 on the second lane 32.

On the other hand, the driving assistance control section 261 determines that a first interrupt condition has been satisfied in cases in which the driving assistance control section 261 is still not able to make a determination that the second lane change control is executable up to elapse of a period of time equivalent to a second threshold from the first time. The second threshold is greater than the first threshold. The second threshold is, for example, 30 seconds. The first interrupt condition is, for example, satisfied when an other-vehicle 36 traveling in the first lane 31 of FIG. 4 moves along a travel path AR3 to a position PS3 in the second lane 32. Moreover the first interrupt condition is also satisfied when, for example, due to a drop in speed of an other-vehicle 37 traveling in the second lane 32 of FIG. 4, an inter-vehicle distance between the vehicle 12 and an other-vehicle 37 is predicted to be less than a specific value were the vehicle 12 to move to the position PS2.

Figure 6:
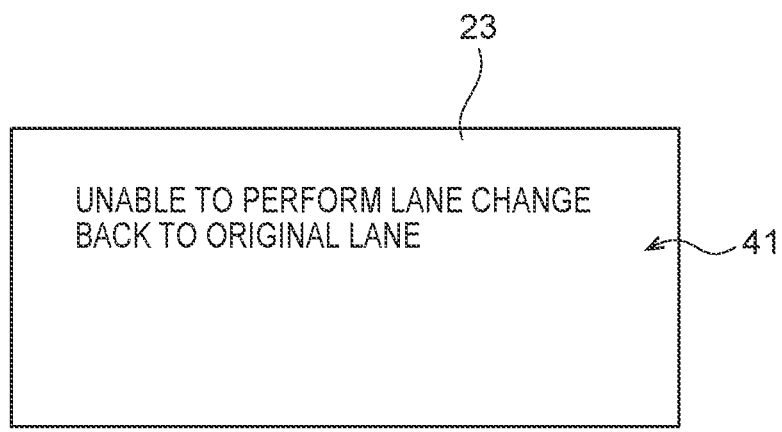
FIG. 6 is a diagram illustrating a display device displaying a second image.

Furthermore, the driving assistance control section 261 reads the second image data from the ROM 26B or the storage 26D when the first interrupt condition has been satisfied, and displays the second image 41 based on the second image data on the display device 23 instead of the first image 40, as illustrated in FIG. 6. The second image 41 displays information relating to interrupt of the second lane change control. For example, the second image 41 is text of "Unable to perform lane change back to original lane".

Moreover, the driving assistance control section 261 determines that the specific second interrupt condition has been satisfied when a predetermined second condition is satisfied as a result of an action of the occupant during an interval from the first time to the text expressing the second confirmation request being displayed on the display device 23. The second condition is satisfied when, for example, an accelerator pedal 19 (see FIG. 1) of the vehicle 12 has been depressed by the occupant. The first image 40 is not displayed on the display device 23 when the second interrupt condition has been satisfied. For example, the first image 40 is not displayed on the display device 23 in cases in which the second interrupt condition has been satisfied prior to elapse of a period of time equivalent to the first threshold from the first time. Moreover, the first image 40 is extinguished from the display device 23 in cases in which the second interrupt condition has been satisfied after elapse of the period of time equivalent to the first threshold from the first time.

The GPS receiver 22, the display device 23, the driving assistance operation device 25, the ECU 26, the sensor group, and the actuator group are configuration elements of the vehicle control device 10.

Operation and Advantageous Effects

Next, description follows regarding the operation and advantageous effects of the present exemplary embodiment.

Next, description follows regarding processing executed by the CPU 26A of the ECU 26. The CPU 26A repeats execution of the processing of the flowchart illustrated in FIG. 7 each time the specific period of time elapses.

At step S10 ("step" will be omitted hereafter), the CPU 26A determines whether or not the first condition is satisfied.

The CPU 26A proceeds to S11 in cases in which determination was YES at S10, and text expressing the first confirmation request is displayed on the display device 23 for a duration of the specific period of time.

Next, the CPU 26A proceeds to S12 and determines whether or not the first acknowledgement action was performed within the specific period of time.

The CPU 26A proceeds to S13 in cases in which determination was YES at S12 and starts the first lane change control.

The CPU 26A proceeds to S14 when the processing of S13 is finished and determines whether or not the first lane change control has finished.

The CPU 26A proceeds to S15 in cases in which determination was YES at S14 and performs determination as to whether or not the second lane change control is executable.

The CPU 26A then proceeds to S16. The CPU 26A proceeds to S17 when determined that the second lane change control is executable, and text expressing the second confirmation request is displayed on the display device 23 for the specific period of time.

The CPU 26A then continues to S18 and determines whether or not the text expressing the second confirmation request was displayed on the display device 23 when a time shorter than the first threshold had elapsed from the first time.

The CPU 26A proceeds to S19 in cases in which determination was YES at S18 and determines whether or not the second acknowledgement action has been performed during the specific period of time.

The CPU 26A proceeds to S20 in cases in which determination was YES at S19 and starts the second lane change control.

The CPU 26A proceeds to S21 when the processing of S20 has finished and determines whether or not the second lane change control has finished.

On the other hand, the CPU 26A proceeds to S22 in cases in which determination was NO at S16 and determines whether or not the second condition has been satisfied.

The CPU 26A proceeds to S23 in cases in which determination was NO at S22, and when a time equivalent to the first threshold has elapsed from the first time, determines whether or not determination has still not been made that the second lane change control is executable. In other words, the CPU 26A determines whether or not the text expressing the second confirmation request is being displayed on the display device 23 when the time equivalent to the first threshold has elapsed from the first time.

The CPU 26A proceeds to S24 in cases in which determination was YES at S23 and displays the first image 40 on the display device 23 for the specific period of time. The CPU 26A proceeds to S25 in cases in which determination was NO at S18 and displays the first image 40 on the display device 23 for the specific period of time.

The CPU 26A proceeds to S26 when NO was determined at S23 or the processing of S24 has finished, and determines whether or not determination that the second lane change control is executable has still not been made from the first time until elapse of a time equivalent to the second threshold.

The CPU 26A proceeds to S27 in cases in which determination was YES at S26 and the second image 41 is displayed for the specific period of time on the display device 23.

The CPU 26A proceeds to S28 when the processing of S27 has finished and interrupts the overtake assist control.

The CPU 26A proceeds to S16 in cases in which determination was NO at S26.

Figure 7:
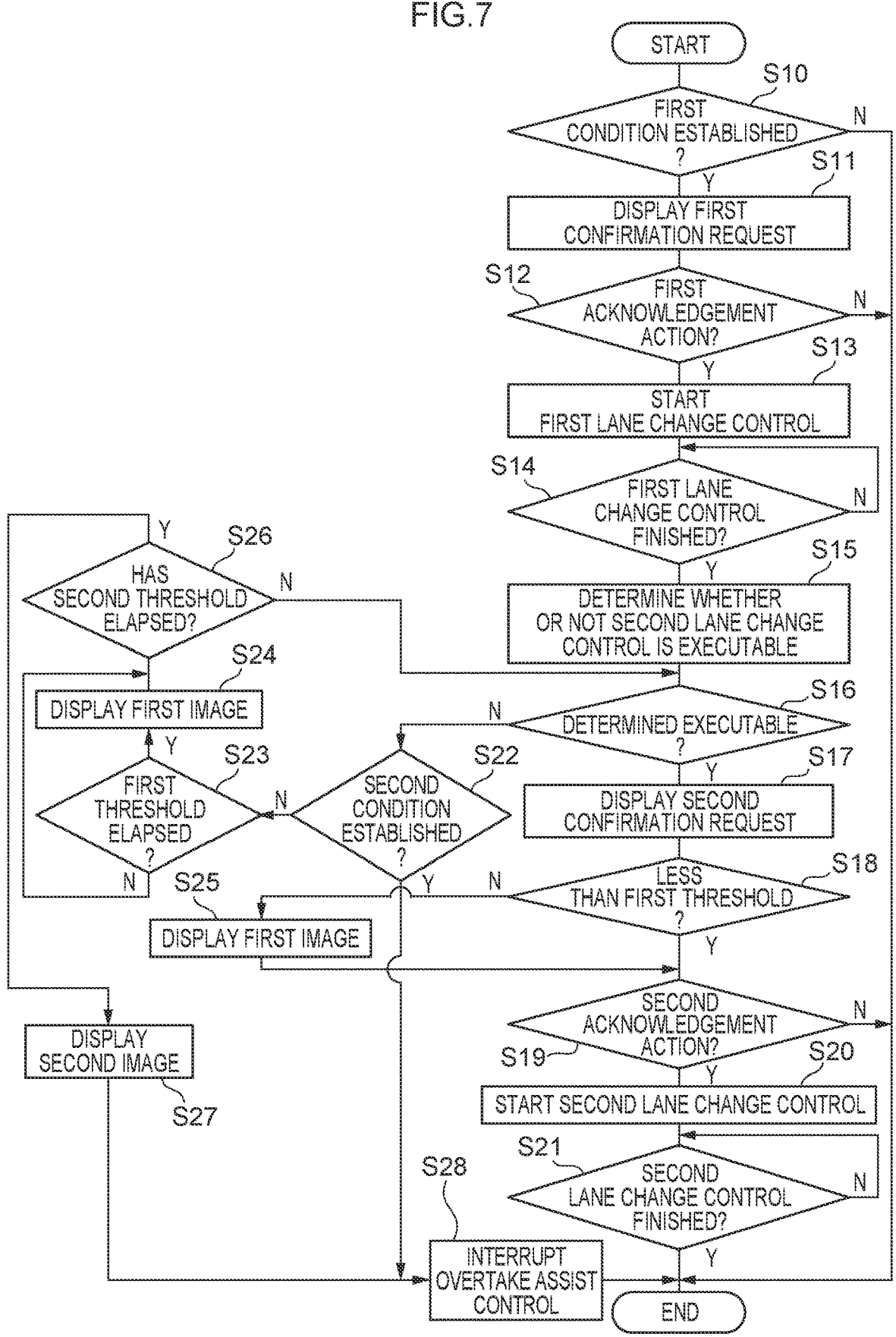
FIG. 7 is a flowchart illustrating processing executed by a CPU of an ECU.

The CPU 26A temporarily ends the processing of the flowchart of FIG. 7 when NO was determined at S10, S12, or S19, when YES was determined at S21, or when the processing of S28 has finished.

The vehicle control device 10 of the present exemplary embodiment as described above is able to execute the second lane change control on the vehicle 12 to return the vehicle 12 from the target lane to the cruising lane after the first lane change control was executed on the vehicle 12 to move the vehicle 12 from the cruising lane (the second lane 32) to the target lane (the third lane 33). Furthermore, the first image 40 expressing information related to the start of the second lane change control is able to be displayed by the display device 23 prior to executing the second lane change control on the vehicle 12 traveling on the target lane. The vehicle control device 10 thereby readily imparts a sense of security to an occupant looking at the display device 23 prior to the second lane change control being executed.

Moreover, the vehicle control device 10 displays the first image 40 on the display device 23 when the second lane change control is not in an executable state for the period of time equivalent to the first threshold from the first time when the vehicle 12 was moved from the cruising lane to the target lane under the first lane change control. In other words, the display device 23 does not display the first image 40 before a period of time less than the first threshold has elapsed from the first time. As a result, the vehicle control device 10 is unlikely to make the occupant feel vexed.

A predicted time until the second lane change control is expected to be in an executable state is included in the first image 40 for display by the display device 23. An occupant looking at the first image 40 is accordingly able to be aware of a time until the second lane change control is likely to be in an executable state.

Furthermore, the second image 41 expressing information related to interrupting the second lane change control is displayed on the display device 23 when the first interrupt condition has been satisfied while the vehicle 12 traveling in the target lane (the third lane 33). An occupant looking at the second image 41 is accordingly able to be aware that the second lane change control has been interrupted.

Furthermore, the display device 23 does not display the first image 40 when the second interrupt condition has been satisfied while the vehicle 12 is traveling in the target lane (the third lane 33). The second condition is satisfied when the accelerator pedal 19 of the vehicle 12 has been depressed by the occupant, and the second interrupt condition is satisfied when the second condition has been satisfied. Namely, the occupant can be aware of interruption of the second lane change control even without looking at the display device 23. This means that there is no need to display the first image 40 on the display device 23 in such cases. The display device 23 is accordingly not liable to make the occupant feel vexed when the second interrupt condition has been satisfied.

Although the vehicle control device 10, the vehicle control method, and the non-transitory storage medium according to the exemplary embodiment have been described above, appropriate design changes may be made thereto within a range not departing from the spirit of the present disclosure.

For example, the driving assistance control section 261 may start the overtake assist control using an action by the occupant of the vehicle 12 as a trigger. For example, the driving assistance control section 261 may start the overtake assist control using performance of a specific action performed on the driving assistance operation device 25 by the occupant as the trigger.

The first image 40 and the second image 41 may be images other than text. The first image 40 may, for example, be an illustration or symbol to express information related to start of the second lane change control. The second image 41 may, for example, be an illustration or symbol to express information related to interruption of the second lane change control.

The first lane change control and the second lane change control may be control to move the vehicle 12 across plural lanes. For example, the vehicle 12 may be moved from the first lane (cruising lane) 31 in FIG. 4 to the third lane (target lane) 33 therein under the first lane change control, and moreover returned to the first lane (cruising lane) 31 from the third lane (target lane) 33 under the second lane change control.

What is claimed is:

1. A vehicle control device, comprising:
   a processor that, after a first lane change control has been executed on a vehicle traveling in a cruising lane to move the vehicle to a target lane, is configured to execute a second lane change control on the vehicle to return the vehicle from the target lane to the cruising lane; and
   a display device that is configured to display a first image expressing information related to a start of the second lane change control prior to the second lane change control being executed on the vehicle traveling in the target lane,
   wherein the display device displays the first image when the second lane change control has not been in an executable state for a period of time equivalent to a first threshold from a first time at which the vehicle was moved from the cruising lane to the target lane under the first lane change control, and
   wherein the display device does not display the first image before a period of time less than the first threshold has elapsed from the first time.

2. The vehicle control device of claim 1, wherein a predicted time until the second lane change control will be in an executable state is included in the first image.

3. The vehicle control device of claim 1, wherein the display device displays a second image expressing information related to interruption of the second lane change control when a first interrupt condition of the second lane change control has been satisfied while the vehicle is traveling in the target lane.

4. The vehicle control device of claim 1, wherein the display device does not display the first image when a second interrupt condition of the second lane change control has been satisfied as a result of an occupant of the vehicle performing a predetermined action while the vehicle is traveling in the target lane.

5. The vehicle control device of claim 3, wherein the interruption of the second lane change control has been satisfied when the processor is unable to determine that the second lane change control is executable up to elapse of a period of time equivalent to a second threshold from the first time, the second threshold being greater than the first threshold.

6. A vehicle control method, comprising, by a processor:
   after a first lane change control has been executed on a vehicle traveling in a cruising lane to move the vehicle to a target lane, executing a second lane change control on the vehicle to return the vehicle from the target lane to the cruising lane; and
   displaying a first image expressing information related to a start of the second lane change control prior to the second lane change control being executed on the vehicle traveling in the target lane,
   wherein the first image is displayed when the second lane change control has not been in an executable state for a period of time equivalent to a first threshold from a first time at which the vehicle was moved from the cruising lane to the target lane under the first lane change control, and wherein the first image is not displayed before a period of time less than the first threshold has elapsed from the first time.

7. A non-transitory storage medium storing a program executable by a computer to perform processing, the processing comprising:

after a first lane change control has been executed on a vehicle traveling in a cruising lane to move the vehicle to a target lane, executing a second lane change control on the vehicle to return the vehicle from the target lane to the cruising lane; and displaying a first image expressing information related to a start of the second lane change control prior to the second lane change control being executed on the vehicle traveling in the target lane, wherein the first image is displayed when the second lane change control has not been in an executable state for a period of time equivalent to a first threshold from a first time at which the vehicle was moved from the cruising lane to the target lane under the first lane change control, and wherein the first image is not displayed before a period of time less than the first threshold has elapsed from the first time.

* * * * *